(12) United States Patent
Wilsher et al.

(10) Patent No.: US 7,760,434 B2
(45) Date of Patent: Jul. 20, 2010

(54) DOCUMENT ILLUMINATOR WITH SURFACE LENS

(75) Inventors: Michael John Wilsher, Herts (GB); Robert P. Herloski, Webster, NY (US); Douglas E. Proctor, Rochester, NY (US); John C. Juhasz, Fairport, NY (US); Eugene A. Rogalski, Jr., Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 993 days.

(21) Appl. No.: 11/513,742

(22) Filed: Aug. 31, 2006

(65) Prior Publication Data
US 2008/0055674 A1   Mar. 6, 2008

(51) Int. Cl.
*G02B 27/10* (2006.01)
(52) U.S. Cl. ...................................................... 359/619
(58) Field of Classification Search .......... 359/619–626
See application file for complete search history.

(56) References Cited

U.S. PATENT DOCUMENTS

| 5,255,171 | A | 10/1993 | Clark |
| 6,236,470 | B1 | 5/2001 | Seachman |
| 2006/0109675 | A1 | 5/2006 | Herloski et al. |
| 2007/0247677 | A1 | 10/2007 | Herloski et al. |
| 2007/0247857 | A1 | 10/2007 | Herloski et al. |

OTHER PUBLICATIONS

3M Electronics Manufacturing: Anti-Reflection Films, Vikuiti™, Jul. 13, 2006.

*Primary Examiner*—Alicia M Harrington
(74) *Attorney, Agent, or Firm*—Fay Sharpe LLP

(57) ABSTRACT

A scanning apparatus includes an illuminator for illuminating a portion of a document to be scanned. The illuminator includes an array of discrete light sources and an optical element. The optical element includes a light-transmissive material and defines a focusing portion and an angular modification portion. The angular modification portion tends to reduce specular flare by modifying the angular distribution of light from the light sources which are within the acceptance angle of a lens arrangement which focuses light from the document onto a sensor.

24 Claims, 5 Drawing Sheets

DOCUMENT ILLUMINATOR WITH SURFACE LENS

CROSS REFERENCE TO RELATED PATENTS AND APPLICATIONS

The following co-pending applications, the disclosures of which are incorporated in their entireties by reference, are mentioned:

U.S. application Ser. No. 11/409,109, filed Apr. 21, 2006, entitled DOCUMENT ILLUMINATOR WITH PARABOLIC OPTICAL ELEMENT, by Robert P. Herloski, et al.;

U.S. application Ser. No. 11/409,137, filed Apr. 21, 2006, entitled DOCUMENT ILLUMINATOR WITH STEPPED OPTICAL ELEMENT, by Robert P. Herloski, et al.; and U.S. application Ser. No. 10/995,462, filed Nov. 23, 2004, Publication No. 2006-0109675, entitled DOCUMENT ILLUMINATOR, by Robert P. Herloski, et al.

BACKGROUND

The present disclosure relates to an illuminating apparatus used to illuminate hard-copy documents for digital recording, such as in digital scanners, facsimile machines, and digital copiers.

In office equipment, such as digital copiers and facsimile machines, original hard-copy documents are recorded as digital data using what can be generally called a "scanner." In a typical scanner, a document sheet is illuminated and the light reflected from the document sheet is recorded by a photosensitive device such as a CCD (charge coupled device) or CMOS (complementary metal oxide semiconductor) array, to be converted to digital image data. In one embodiment, a narrow strip of the document sheet is illuminated as the sheet is moved through a document handler, or the photosensitive device is moved relative to a platen on which the document sheet is placed.

One type of illuminator useful in document scanning includes a light-transmissive element that exploits internal reflections to direct light from one or more point sources, such as light emitting diodes (LEDs) to emerge in substantially parallel rays from an exit surface of the element toward a document.

Designing an illuminator for a scanner presents challenges in providing, among other aspects, an even illumination along the narrow strip of the document, as well as providing a suitable illumination profile across the narrow strip.

The angular distribution of light produced by the illuminator at the document can vary in the fast scan direction, depending upon the illuminator architecture. Irregularities in the illumination level in the illuminated area can result in defects in the image data, particularly in the case of discrete light sources, such as LEDS. While light guides are able to focus light with high efficiency on the imaging area of the platen, it has been found that glossy document surfaces which are uneven, e.g., crumpled or curved from the platen, may reflect the light toward the photosensitive device unevenly, resulting in bright spots in the image.

INCORPORATION BY REFERENCE

U.S. Pat. No. 6,236,470 for REFLECTOR AND LIGHT SOURCE REGISTRATION DEVICE FOR A DOCUMENT ILLUMINATOR by Seachman provides an overview of the art of designing illumination devices for scanners.

U.S. Pat. No. 5,255,171 and U.S. Patent Publication 2004-0131157 disclose a compound parabolic concentrator (CPC).

BRIEF DESCRIPTION

In accordance with one aspect of the exemplary embodiment, a scanning apparatus includes an illuminator for illuminating a portion of a document to be scanned. The illuminator includes an array of discrete light sources and an optical element. The optical element includes a light-transmissive material and defines a focusing portion and an angular modification portion.

In accordance with another aspect, an illuminator includes an array of discrete light sources and an optical element which transmits light from the light sources. The optical element includes a light-transmissive material. The optical element defines a periodically undulating exit surface spaced from the light sources and opposed first and second substantially parabolic surfaces defined intermediate the light sources and the undulating exit surface.

In another aspect, a method for scanning a document includes actuating a plurality of discrete light sources to emit light, transmitting the light through an optical element which illuminates the document with a beam having a length substantially greater than a width of the beam. The transmitting includes transmitting the light through a plurality of lenticules which redirect the light in the length dimension to a substantially greater extent than in the width dimension.

In another aspect, an apparatus for illuminating a portion of a document to be recorded includes an optical element comprising a light-transmissive material of a predetermined refractory index. The optical element defines an entry surface and an exit surface opposite the entry surface. A height of the optical element is defined between the entry surface and the exit surface. The exit surface is defined by a plurality of lenticules, each lenticule having a length which is substantially less than the height of the optical element and a uniform cross section in a width dimension. A first substantially parabolic surface is defined intermediate a first edge of the entry surface and a first edge of the exit surface, and a second substantially parabolic surface is defined intermediate a second edge of the entry surface and a second edge of the exit surface.

DETAILED DESCRIPTION

Figure 1:
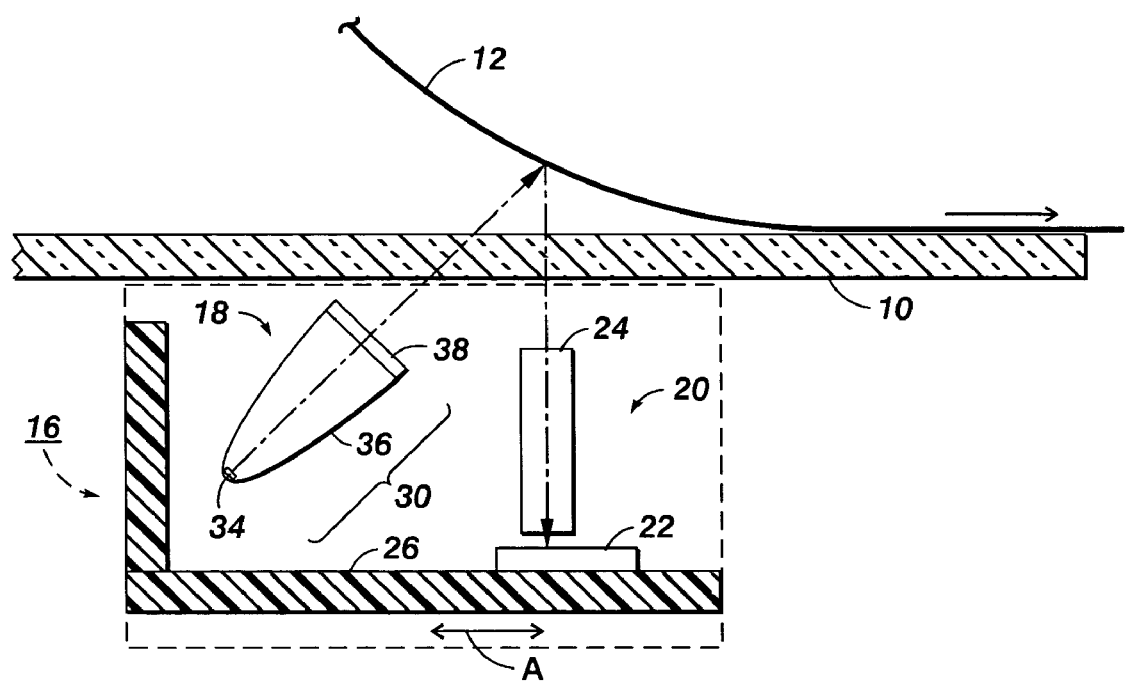
FIG. 1 is a simplified elevational view of a document scanner according to the exemplary embodiment.

Aspects of the exemplary embodiment relate to an optical element and to a document scanning apparatus or "scanner" which incorporates the optical element. The exemplary embodiment also relates to a method of scanning physical documents for generating scanned images. The documents to be scanned may comprise sheets of paper or other flexible substrate, on which an image or images to be scanned is disposed. The scanner may form a part of an imaging device, such as such as a standalone scanner, a copier, a facsimile machine, or a multifunction device, in which a scanned image is rendered on paper and/or stored in digital form, for example, for display, processing, or transmission in digital form.

Without intending to limit the scope of the exemplary embodiment, it is understood that specular flare light is created when a combination of conditions (such as a glossy document) enables a portion of the light from the illumination source to specularly reflect into the imaging sensor and add to its signal output. The specular flare light is an undesired addition to the light signal picked up from the light diffused by the document. This creates an artifact that may or may not be objectionable to customers depending upon the conditions. The artifact is usually noticeable on edges along the fast scan direction (potentially both leading and trailing edges). For uniform sources, such as fluorescent lamps, the specular flare artifact is usually a continuous line; for discrete sources, such as LED arrays, the specular flare artifact is discontinuous and periodic, often appearing as bright spots in the image.

Flare artifacts may be created on printed copies of a document if one or more of the following conditions is met:

A glossy or shiny document is being scanned.

Dark content bleeds to the edge of the document.

The document is curved away from the platen glass or perfect bound glossy edge or crinkled document conditions exist.

When flare occurs outside of the normal edge erase feature. It is normal for a 3 mm border around a document to be blanked out or erased. When flare occurs outside this edge erase feature, it becomes visible to the user. Additionally, since some users turn off the edge erase feature to reproduce the entire document, flare within the border area may also be a problem.

In general, some level of gloss is required to show the effect. The glossier the document, and the darker the image content, the more the specular flare artifact is enhanced.

For LED array illuminators, the angular distribution of light at the document varies significantly in the fast scan direction. The distribution is particularly influenced by whether the area illuminated is located directly over an LED or is between two LEDs. Under specular flare conditions, the specular light received by an image sensor of a detector depends upon the angular acceptance angle of the imaging lens. The angular acceptance angle of the imaging lens can be expressed as $\pm\theta$, where $\theta$ may be 5°, 10°, or other predefined angle which is a fixed property of the lens. In general, light that is incident at an angle of $\leq \pm\theta$ relative to the normal to the platen (in the fast scan direction) will, under specular flare conditions, be reflected at an angle of $\leq \pm\theta$ relative to the optical axis of the imaging lens and will be captured by the imaging lens and transmitted to the image sensor. Light outside that range of angles will not be transmitted by the lens. At those fast scan locations above, or nearly above, an LED, there is a significant portion of light with an angular distribution within the acceptance angle of the lens, and the specular flare light is transmitted to the image sensor. However, between LEDs, if the gap is large enough, the only light incident on the platen has an angular distribution greater than the acceptance angle of the lens, and hence is not transmitted to the image sensor.

It has been found that by modifying the angular distribution of light from the light source(s), specular flare effects can be minimized or avoided altogether. The modification of the angular distribution may result in more of the light from the light source being brought into the acceptance angle of the imaging lens.

With reference to FIG. 1, a document scanner includes a platen 10, which may have distinct parts, on which a document sheet 12 can be placed for recording therefrom. Optionally, associated with platen 10 is a document handler (not shown), which sequentially feeds sheets from a multi-page original document.

A scan head 16 is positioned to illuminate the document and includes an illuminator 18 and a detector 20. The detector includes a photosensitive device 22 and a lens arrangement 24. The illuminator 18 illuminates a thin strip of the document while the photosensitive device 20, which includes one or more linear arrays of photosensors, records the reflected light. The photosensors may comprise solid state devices, such as CCD (charge coupled device) or CMOS (complementary metal oxide semiconductor) devices. The detector includes a suitable processing device (not shown) for generating an image comprising signals representative of reflected light recorded by the photosensitive device. The lens arrangement 24, such as a SEFLOC® lens or other microlens arrangement with a predetermined acceptance angle $\theta$, is interposed between the platen 10 and the photosensitive device 22 for focusing the reflected light on the photosensor array. A SELFOC® lens is a gradient index lens which consists of fiber rods with a parabolic index profile. The scan head 16 can be mounted on a moveable carriage 26, for recording light reflected from images on sheets placed on the main portion of platen 10. In general, the carriage translates in direction A, as shown in FIG. 1.

Figure 2:
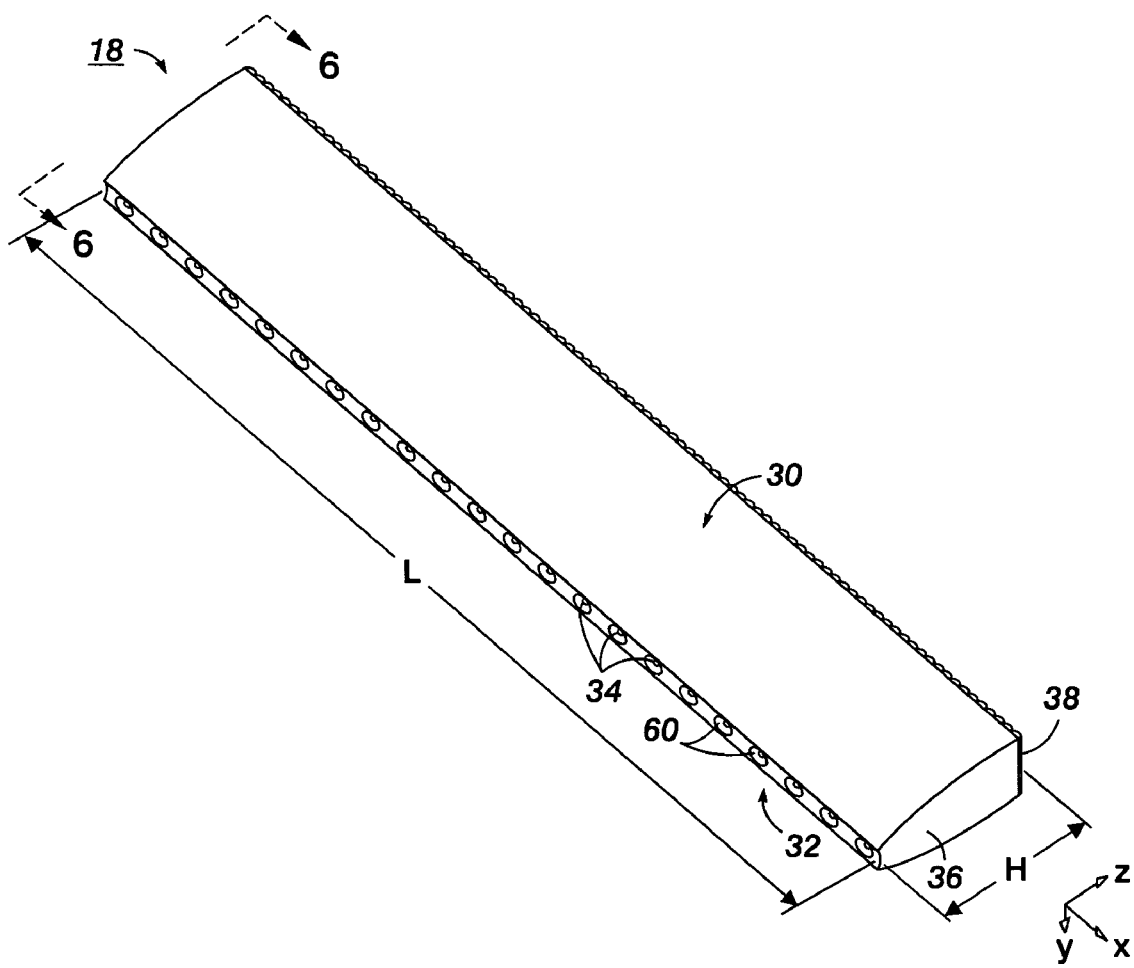
FIG. 2 is a perspective view of one embodiment of an optical element for the document scanner of FIG. 1.

As best shown in FIG. 2, the illuminator 18 includes an optical element 30 and a linear array 32 of discrete light sources 34, such as light emitting diodes or laser diodes (both of which will be referred to herein as LEDs). In the exemplary embodiment described herein, the light sources are actuated contemporaneously, for generation of a full width beam, although in other embodiments, it is contemplated that the LEDs may be actuated sequentially. Other discrete light sources are also contemplated, such as fiberoptic light guide tubes. As shown in FIG. 1, the optical element 30 is arranged at an angle relative to a surface of the document being recorded. The optical element 30 can be made of any light-transmissive material, such as glass or plastic, of a predetermined refractory index. The optical element 30 focuses light from the light sources 34 onto the imaging area of the platen. In one embodiment, the scanner includes two illuminators 18 which direct light to substantially the same small area of a document to be illuminated, but from different directions.

The optical element 30 comprises a first or focusing portion 36 and a second or angular modification portion 38 which is spaced from the array 32 by the focusing portion 36 which focus the light in first and second mutually perpendicular planes, respectively. In particular, the focusing portion 36 serves as a light guide and focuses the light from the light sources 34 into a narrow focused beam which extends in the x direction, as illustrated in FIG. 2, which shows mutually perpendicular axes x, y, and z for reference. The focusing portion 36 focuses the beam in the yz plane, leaving the angular distribution of light in the xz plane substantially unchanged. The x direction extends generally parallel to the fast scan direction of the page to be scanned. The beam created by the focusing portion has a width in the y direction and a length in the x direction. The beam width is narrow, in comparison with its length, such that the beam has a length suitable for illuminating a scan line across the page on reaching the document.

Figure 4:
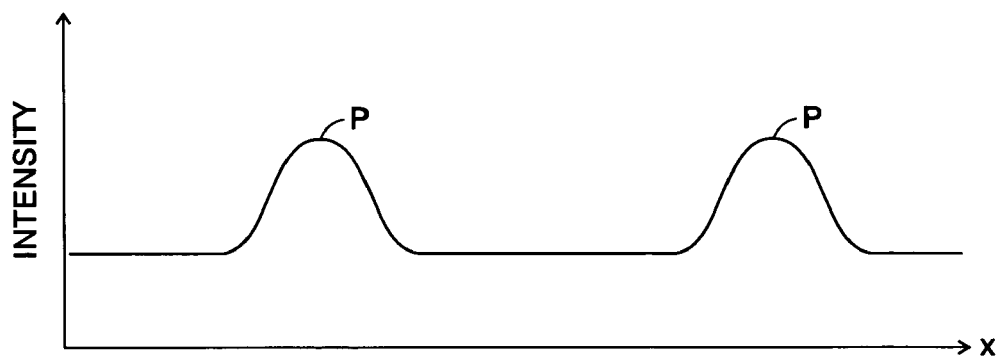
FIG. 4 is a schematic plot which illustrates light intensity, in the specular direction, at the document surface for a scanner with an optical element without an angular modification portion.
Figure 5:
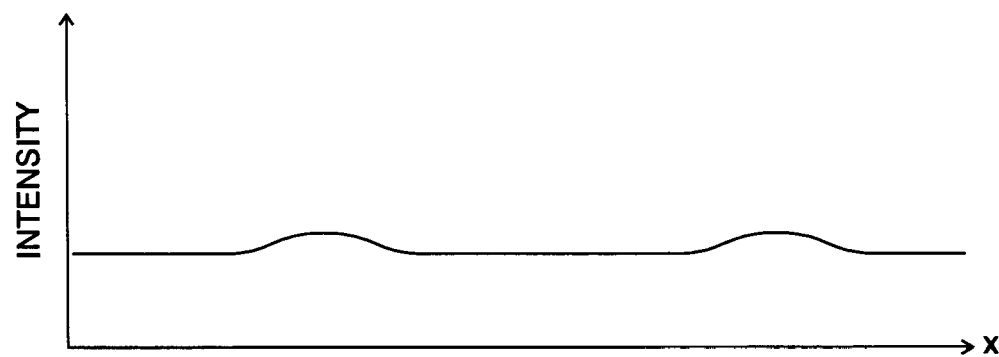
FIG. 5 is a schematic plot which illustrates light intensity, in the specular direction, at the document surface for a scanner with an optical element incorporating the angular modification portion of FIG. 2.

The angular modification portion 38 serves to modify the angular distribution of the beam in the x direction, while substantially maintaining the narrow width of the beam in the y direction. In particular, the angular modification portion focuses the beam in the xz plane to bring more of the light within the acceptance angle θ of the lens 24. This has the effect of smoothing the intensity of light emitted by the discrete point sources 34 in the x direction as illustrated schematically in FIGS. 4 and 5. FIG. 4 shows the light intensity in the x direction without the angular modification portion 36. Peaks P in the intensity correspond generally to the locations of the discrete point sources. FIG. 5 illustrates the intensity in the presence of the angular modification portion, where the peaks are substantially eliminated.

The focusing portion 36 may be configured as described, for example, in above-mentioned application Ser. Nos. 11/409,109 or 11/409,137, incorporated by reference, except as noted herein. The angular modification portion 38 may be integrally formed with the focusing portion 36, for example, by molding, and thus have the same refractive index. Alternatively, the angular modification portion 38 may be separately formed from the same or a different optically transmissive material from that of the focusing portion, and sealed to the focusing portion. In this embodiment, the angular modification portion 38 may have the same or a different refractive index from the focusing portion 36. For example, in this embodiment, a 3M Vikuity™ brand polyester film in which the surface comprises lenslets (e.g., Vikuity™ ARM-200, ARMP-200, or ARMR-200) may be adhesively adhered to the angular modification portion. In yet another embodiment, the angular modification portion 38 may be spaced from the focusing portion 36 in the z direction.

Figure 6:
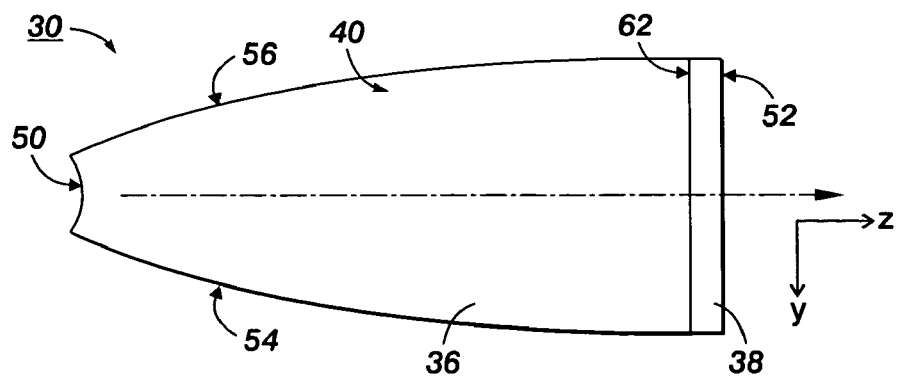
FIG. 6 is a sectional view of the optical element of FIG. 2.

As illustrated in FIG. 6, the focusing portion 36 may have a cross sectional profile 40 which is substantially the same along the length L of the optical element in the x direction, or at least over the entire page width of the focusing portion, as for the optical element described in Ser. No. 11/409,109.

Figure 3:
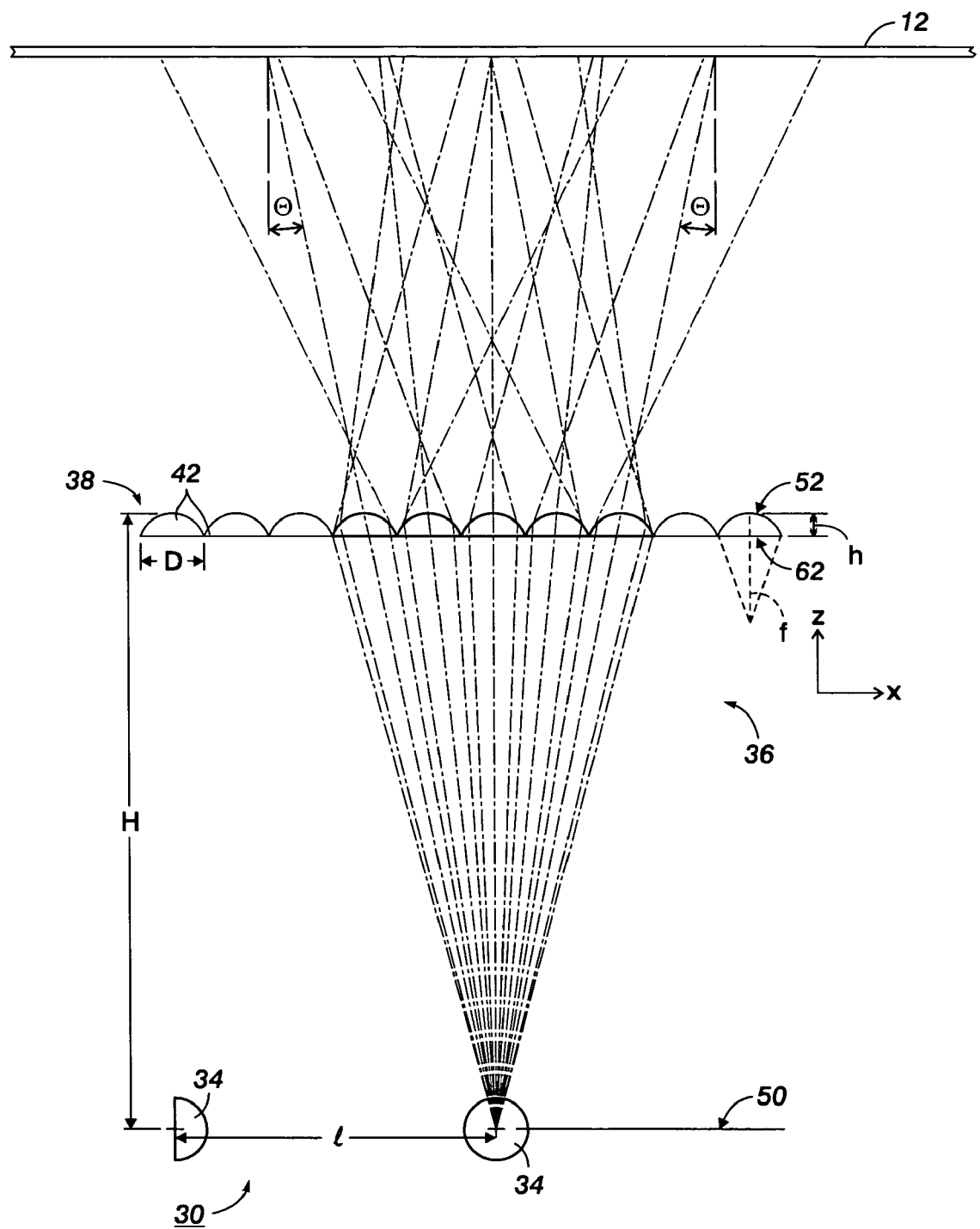
FIG. 3 is a ray diagram, not to scale, illustrating bringing of light rays intermediate LEDs into an acceptance angle $\theta$.
Figure 7:
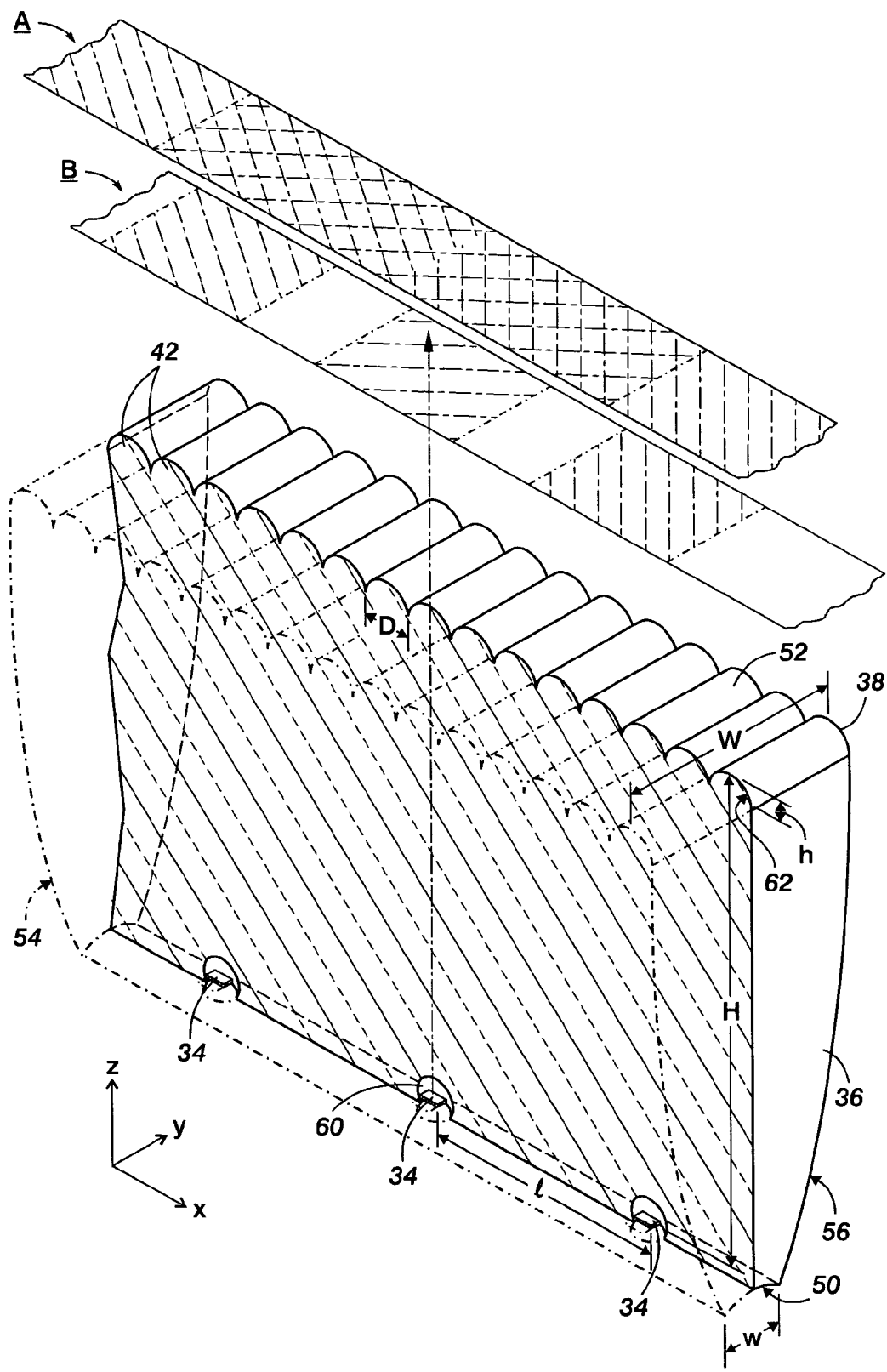
FIG. 7 is a perspective view of a portion of the optical element of FIG. 2 illustrating illumination of a document with a beam of light from the optical element with the angular modification portion (A) and without the angular modification portion (B), demonstrating the portion of light which is within the acceptance angle.

The profile of the angular modification portion 38 is generally substantially consistent in the y direction but varies in the x direction. In the illustrated embodiment, the angular modification portion has a lenticular lens structure comprising an array of lenticules 42, each having a curved exterior surface and a width W (in the y direction) greater than a length D (in the x direction), as best shown in FIGS. 3 and 7. In particular, the lenticules each have a convex exterior surface. The cross sectional profile of each lenticule 42 may be uniform over the width W of the angular modification portion. By uniform cross section, it is meant that the cross section is substantially the same across that width (in the y direction) of the angular modification portion through which the beam is passed. For example, the lenticules 42 may each have a cross section which is curved, e.g., semicircular, elliptical, or parabolic along the exposed edge. In other embodiments (not shown) the lenticules may include one or more planar exposed faces, such as a planar face which meets a radiused face. In general, the lenticules, in combination, define an undulating exposed surface 52 with peaks and troughs whereby specular light from the focusing portion is diffused in the x direction. In general, the lenticular lens modifies the angles of the rays of light emitted by the LEDs, especially those in between the LEDs, such that some of the ray angles now fall within the acceptance angle θ of the SELFOC® lens array, and hence the rays are imaged onto the image sensor.

As shown in FIG. 3, the diameter D (lenticule spacing) or radius of curvature, where semicircular, of the lenticule 42 may depend on the spacing l between light sources 34. In general the length l is greater than the diameter (length) D of the lenticule. For example, there may be at least about two lenticules 42 per LED source 34. There may be at least 10 lenticules per LED source and up to about 150 lenticules per LED source, or more. Typically, there may be about 0.3-5 LEDs 34 per linear centimeter of the array and about 10 to 70 lenticules per linear centimeter.

The optical element has a height H which is substantially greater than a maximum height h of the lenticule 42 in the z direction and also substantially greater than the focal length f of the lenticule, so that the effect of each lenticule is to converge that portion of the light striking the lenticule at wider angles, thus creating a more uniform intensity in the x direction. For example, ratio of H:h may be at least 5:1, and generally at least 10:1 and may be up to about 100:1.

In the illustrated embodiment, the optical element 30 defines an entry surface 50, an undulating exit surface 52, and first and second parabolic side surfaces 54, 56 and second parabolic surface 18 (FIG. 7). In each case the more curved portion of each parabolic surface 54, 56 is disposed near the entry surface 50, as shown. The exit surface 52 is the surface through which light is directed toward a document, such as shown in FIG. 1.

The parabolic surfaces 54, 56 may be only generally parabolic in shape. In one practical embodiment, each parabolic surface 54, 56 can closely follow the shape of half a true parabola. This profile generally forms what is known as a compound parabolic contractor, or CPC. When the CPC is formed from a solid, light-transmissive member exploiting light refraction and total internal reflection, the CPC is typically known as a "dielectric compound parabolic contractor," or DCPC, but it is conceivable that the optical effect of the CPC can alternatively be obtained with reflective surfaces.

If the small, point-like light sources 34 are in the form of small LEDs, each source 34 can be disposed within a dimple-shaped concavity 60 in entry surface 50. Alternatively, the concave structure of entry surface 50 can be in the form of a concave channel extending the length of optical element 30. The entry surface 50 can also be a convex surface. In the illustrated embodiment, the surfaces 54, 56 are of equal size with an end face 62 of the focusing portion 36 being generally normal to the light rays exiting the focusing portion in the plane yz. In alternative embodiments the end face may be angled slightly to the light rays, as illustrated in FIG. 5 of Ser. No. 11/409,109. The "tilt" in the face 62 may be between five and fifteen degrees, e.g., about ten degrees, from perpendicular to a y, z plane of symmetry of the optical element.

In a practical embodiment, the width w of entry surface 50 is in a range of about 0.3-2.0 mm; the width W of exit surface 52 is in a range of about 2-10 mm; and the circumferential height of the parabolic surfaces 54, 56 is in a range of about 10-30 mm. In one illustrative embodiment, the LEDs 34 are spaced at intervals l of about 21 mm. The distance from the LED to the platen surface closest to the sheet is about 27 mm. The SELFOC lens 24 of the detector has an acceptance angle θ of about ±9 degrees. Thus, at the platen, the area which has light at angles less than ±9 deg. is roughly 2*27*tan 9°=8.6 mm, or 40% of the LED spacing. The area is increased by the angular modification portion 38 to approximately that of the LED spacing resulting in a significant reduction in flare spots.

The optical element 30 preserves the narrow beam width (y direction) provided by the focusing portion 36 while having the effect of diffusing (defocusing) the beam slightly in the x direction (along the beam length, i.e., along the scan line), by bringing more of the light into the acceptance angle θ of the SELFOC® lens. The result is to minimize the tendency to form spots on an image when glossy document surfaces are to be imaged as compared with an optical element formed with an optically smooth exit surface (i.e., without the angular modification). The improvement in image quality is achieved with little or no loss in illumination power, since the beam width is not influenced significantly by the angular modification portion 38.

While the angular modification portion 38 has been described in terms of a periodic structure, such as an array of lenslets, it is also contemplated that the angular modification may be provided by a non-periodic angular modification portion. For example, the angular modification portion 38 may comprise randomized surface relief structures. Suitable films of this type which are useful as the angular modification portion are available as LSD® Light Shaping Diffusers from Physical Optics Corp. These films have holographically recorded, randomized surface relief structures that enable high transmission efficiency (up to 92%), and controlled angular distribution. These fully randomized (non-periodic) structures are non-wavelength dependent and provide controlled angular light divergence.

As is known in the art, the scanner may include memory for storing the scanned digital image. An image rendering device incorporating or linked to the scanner may include an image rendering component, such as a marking engine, which renders the stored image on a substrate, such as paper, using colorants such as inks or toners. A facsimile machine incorporating or linked to the scanner may include a processing component for outputting the stored digital image in a form which may transmitted via a telephone line, cable link or other suitable wired or wireless link.

Without intending to limit the scope of the exemplary embodiment, the following example demonstrates the effectiveness of the exemplary optical element.

Example

A scanning device was configured with two optical elements of the type illustrated in copending application Ser. No. 11/409,109. The optical elements were arranged to illuminate a document. One of the optical elements had its exit face covered with a 75 dpi lenticular lens (75 lenticules per linear inch) to provide the optical element with an angular modification portion, while the other optical element was left uncovered. A document (a glossy magazine cover) was placed on the platen. A test image (photograph) of the document in the specular direction showed the beam patterns of the two optical elements. The beam pattern from the uncovered optical element was made up of discrete spots of light, spaced at intervals in the x direction, corresponding to the LED elements. The beam pattern for the covered optical element was substantially continuous in the x direction. The spots (barely differentiable) were spread to the point that they substantially overlapped.

As will be appreciated, although the illumination artifacts, such as specular flare, which the lenticular lens arrangement 38 addresses, may be reduced or even eliminated by increasing the number of light sources, such an approach tends to add a significant cost to the scanning device. The lenticular lens arrangement 38 provides a more elegant solution to the problem which can be readily implemented in both new and existing scanning devices.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A scanning apparatus comprising:
an illuminator for illuminating a portion of a document to be scanned, the illuminator comprising:
an array of discrete light sources, and
an optical element, the optical element comprising a light-transmissive material and defining a focusing portion and an angular modification portion, the angular modification portion comprising a lenticular lens.

2. The apparatus of claim 1, wherein the lenticular lens comprises a plurality of lenticules, each of the lenticules having a uniform cross section.

3. The apparatus of claim 2, wherein the cross section is curved.

4. The apparatus of claim 2, wherein a ratio of a total number of lenticules to a total number of the light sources in the illuminator is at least 2:1.

5. The apparatus of claim 4, wherein the ratio is at least 5.

6. The apparatus of claim 2, wherein the angular modification portion comprises at least about 20 lenticules per linear centimeter.

7. The apparatus of claim 1, wherein the angular modification portion modifies an angular distribution of light received from the focusing portion.

8. The apparatus of claim 1, wherein the focusing portion focuses light from the light sources in a first plane and wherein the angular modification portion modifies an angular distribution of light in a second plane generally perpendicular to the first plane.

9. The apparatus of claim 1, wherein the angular modification portion is spaced from the light sources by the focusing portion.

10. The apparatus of claim 1, wherein the angular modification portion defines an exit face, through which light from the light sources exits the illuminator.

11. The apparatus of claim 1, wherein the focusing portion defines an entry surface opposite the angular modification portion and a first substantially parabolic surface defined between a first edge of the entry surface and the angular modification portion and a second substantially parabolic surface defined between a second edge of the entry surface and the angular modification portion.

12. The apparatus of claim 11, wherein the light sources are at least partially disposed in the entry surface.

13. The apparatus of claim 1, further comprising a photosensitive device positioned to receive light reflected from the document for recording an image of the document.

14. The apparatus of claim 1, further comprising a platen for supporting the document, the platen being disposed generally adjacent an exit surface of the optical element.

15. The apparatus of claim 1, wherein the optical element and the light sources are supported on a movable carriage.

16. The apparatus of claim 1, wherein the discrete light sources comprise LEDs.

17. A scanning apparatus comprising:
an illuminator for illuminating a portion of a document to be scanned, the illuminator comprising:
an array of discrete light sources, and
an optical element, the optical element comprising a light-transmissive material and defining a focusing portion and an angular modification portion, the angular modification portion defining an exit face, through which light from the light sources exits the illuminator and wherein the exit face undulates.

18. The apparatus of claim 17, wherein the angular modification portion comprises a lenticular lens.

19. A scanning apparatus comprising:
an illuminator for illuminating a portion of a document to be scanned, the illuminator comprising:
an array of discrete light sources, and
an optical element, the optical element comprising a light-transmissive material and defining a focusing portion and an angular modification portion;
a photosensitive device positioned to receive light reflected from the document for recording an image of the document; and
a lens arrangement intermediate the document and the photosensitive device, and wherein the angular modification portion increases a proportion of light from the light sources which falls within an acceptance angle of the lens arrangement.

20. The apparatus of claim 19, wherein the angular modification portion comprises randomized surface relief structures.

21. An illuminator comprising:
an array of discrete light sources; and
an optical element which transmits light from the light sources, the optical element comprising a light-transmissive material and defining:
a periodically undulating exit surface spaced from the light sources,
opposed first and second substantially parabolic surfaces defined intermediate the light sources and the undulating exit surface.

22. A scanning apparatus comprising the illuminator of claim 21.

23. A method for scanning a document comprising:
actuating a plurality of discrete light sources to emit light;
transmitting the light through an optical element which illuminates the document with a beam having a length substantially greater than a width of the beam, the transmitting including transmitting the light through a plurality of lenticules which redirect the light in the length dimension to a substantially greater extent than in the width dimension.

24. An apparatus for illuminating a portion of a document to be recorded, comprising:
an optical element comprising a light-transmissive material of a predetermined refractory index and defining:
an entry surface,
an exit surface opposite the entry surface, a height of the optical element being defined between the entry surface and the exit surface, the exit surface being defined by a plurality of lenticules, each lenticule having a length which is substantially less than the height of the optical element and a uniform cross section in a width dimension,
a first substantially parabolic surface defined intermediate a first edge of the entry surface and a first edge of the exit surface, and
a second substantially parabolic surface defined intermediate a second edge of the entry surface and a second edge of the exit surface.

* * * * *